(12) United States Patent
Howard

(10) Patent No.: US 11,794,224 B1
(45) Date of Patent: Oct. 24, 2023

(54) TOOLS FOR AND METHODS OF DEBRIS REMOVAL IN CHEMICAL INJECTION PORTS

(71) Applicant: Michael Shane Howard, Orlando, FL (US)

(72) Inventor: Michael Shane Howard, Orlando, FL (US)

( * ) Notice: Subject to any disclaimer, the term of this patent is extended or adjusted under 35 U.S.C. 154(b) by 0 days.

(21) Appl. No.: 17/826,292

(22) Filed: May 27, 2022

Related U.S. Application Data

(60) Provisional application No. 63/194,365, filed on May 28, 2021.

(51) Int. Cl.
*B08B 9/045* (2006.01)
*B08B 7/02* (2006.01)
*C02F 1/68* (2023.01)

(52) U.S. Cl.
CPC .............. *B08B 9/045* (2013.01); *B08B 7/02* (2013.01); *B08B 2209/04* (2013.01); *C02F 1/685* (2013.01); *C02F 2303/14* (2013.01); *C02F 2303/22* (2013.01)

(58) Field of Classification Search
CPC ......... B08B 9/045; B08B 9/0436; B08B 7/02; C02F 2303/22; E03B 7/006; E03C 1/30
See application file for complete search history.

(56) References Cited

U.S. PATENT DOCUMENTS

| | | | | |
|---|---|---|---|---|
| 5,035,796 A | * | 7/1991 | Saylor | E03B 7/006 134/167 C |
| 2007/0086271 A1 | * | 4/2007 | Hamilton | B01F 33/5011 366/326.1 |

FOREIGN PATENT DOCUMENTS

| CN | 202945233 U | * | 5/2013 | ............ C12M 21/04 |
|---|---|---|---|---|

OTHER PUBLICATIONS

Machine translation: CN202945233U; Xiang et al. (Year: 2013).*

* cited by examiner

*Primary Examiner* — Natasha N Campbell
(74) *Attorney, Agent, or Firm* — Terry M. Sanks, Esq.; Beusse Sanks, PLLC

(57) ABSTRACT

A decalcification tool for cleaning chemical feed injection port includes a rod having a first end, a second end and a handle bar segment between the first end and the second end. The tool includes a stopper having a threaded exterior surface for mating with an orifice of an injection port and being installed on the rod at a location below the handle rod segment and above the first end. The stopper is slidable along a portion of a longitudinal axis of the rod. The tool includes a paddle integrated with or affixed to the first end of the rod and configured to be inserted into the injection port. Rotation of the rod causes the paddle to rotate within the injection port such that the paddle applies impact forces to chip, crack, or breakup debris along an interior surface of the injection port.

20 Claims, 8 Drawing Sheets

TOOLS FOR AND METHODS OF DEBRIS REMOVAL IN CHEMICAL INJECTION PORTS

CROSS-REFERENCE TO RELATED APPLICATIONS

This application claims priority benefit of U.S. Provisional Application No. 63/194,365, titled "DEVICE FOR AND METHODS OF DEBRIS REMOVAL IN CHEMICAL INJECTION PORTS," filed May 28, 2021, which is incorporated herein by reference in its entirety.

BACKGROUND

The embodiments are directed to tools and methods for the decalcification of chlorine injection port in a water treatment system. The embodiments provide methods for using the decalcification tool to safely clear injection ports without damaging the Polyvinyl chloride (PVC) or other sensitive lining material of an injection port. The embodiments further provide methods of cleaning inlet and outlet ports of liquid containers subject to chlorine treatment using the decalcification tool.

It is typical in the treatment of water, or other liquids, in holding vessels the need to inject chemicals into the liquid supply to treat the liquid supply for a variety of reasons. One example is the treatment of a water supply with chlorine. The chlorine, in this example, is injected with a needle through an injection port, or injection quill to protect the injection port. However, over time, the port or quill will become calcified and unusable. This can occur in multiple types of chemical injection ports and with other types of chemicals, such as ammonia, when solidification occurs. This clogging obstruction prevents the liquid or gas supply until the injection site can be cleared. Unfortunately, this situation often occurs and the only remedy that most operators have is to take a steel, or other hard material, rod and hammer it through the clog. This practice only: 1) creates a small opening in the obstruction which dangerously sprays chemicals all over the machine operator; 2) needs further treatment more frequently because the hole closes up again more quickly; and 3) creates permanent damages to the injection port or quill are very costly to repair and create down time in operations. Thus, there exists a need in the field for a more elegant and cost-effective approach to solve this problem.

SUMMARY

The embodiment herein provides tools and methods for the decalcification of chlorine injection port in a water treatment system. The embodiments provide methods for using the decalcification tool to safely clear injection ports without damaging the PVC or other sensitive lining material of an injection port. The embodiments further provide methods of cleaning inlet and outlet ports of liquid containers subject to chlorine treatment using the decalcification tool.

An aspect of the embodiments includes a decalcification tool for cleaning chemical feed injection port which includes a rod having a first end, a second end and a handle bar segment between the first end and the second end. The tool includes a stopper having a threaded exterior surface for mating with an orifice of an injection port and being installed on the rod at a location below the handle rod segment and above the first end. The stopper is slidable along a portion of a longitudinal axis of the rod. The tool includes a paddle integrated with or affixed to the first end of the rod and configured to be inserted into the injection port. Rotation of the rod causes the paddle to rotate within the injection port such that the paddle applies impact forces to chip, crack, or breakup debris along an interior surface of the injection port.

An aspect of the embodiments includes a method of cleaning a chemical injection port using a decalcification tool to apply impact forces to chip, crack, or breakup debris along an interior surface of the injection port.

DETAILED DESCRIPTION

Figure 1A:
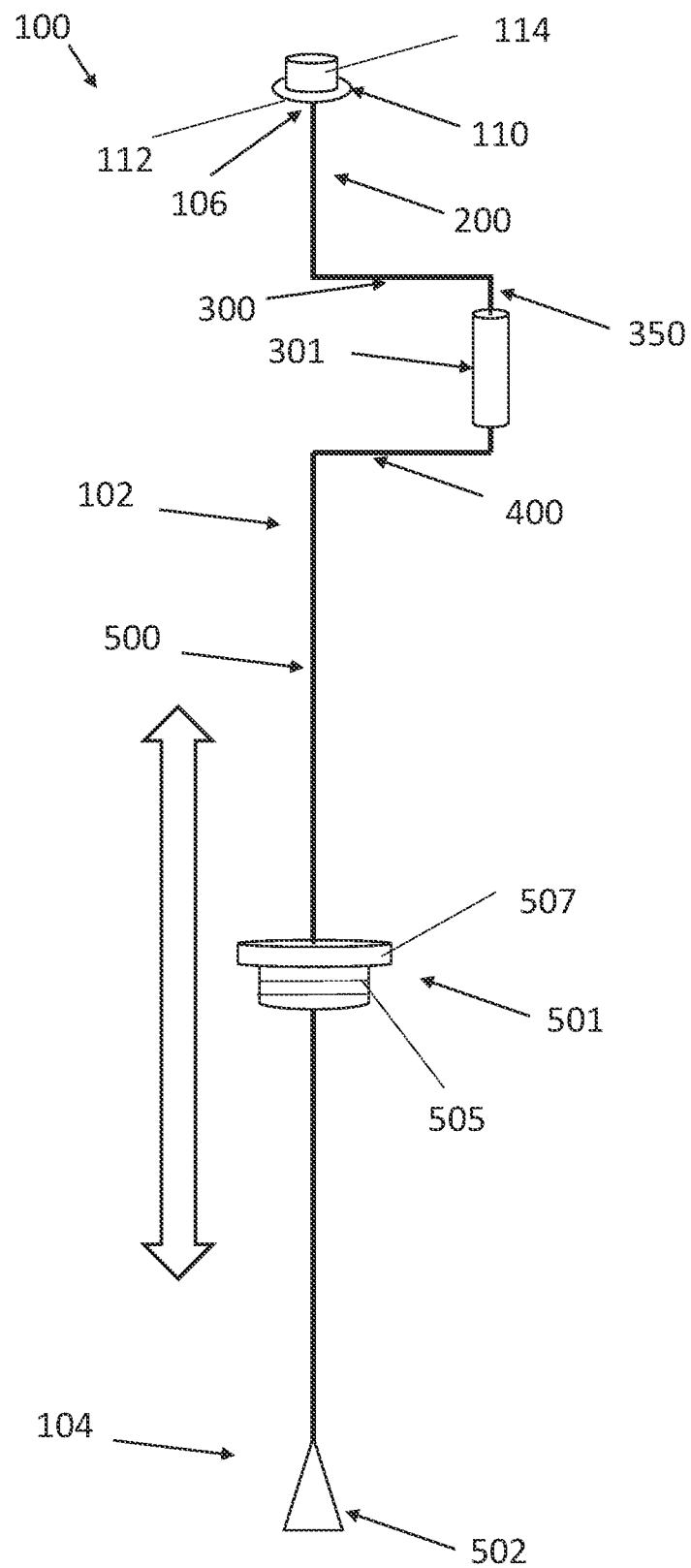
FIG. 1A illustrates a decalcification tool in accordance with some embodiments.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Furthermore, unless otherwise clear from the context, a numerical value presented herein has an implied precision given by the least significant digit.

Thus, a value 1.1 implies a value from 1.05 to 1.14. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Definitions

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another. As used herein the expression "at least one of A and B," will be understood to mean only A, only B, or both A and B.

It is noted that in this disclosure and particularly in the claims, terms such as "comprises," "comprised," "comprising," and the like can have the meaning attributed to it in U.S. Patent law; e.g., they can mean "includes," "included," "including," and the like; and that terms such as "consisting essentially of and "consists essentially of have the meaning ascribed to them in U. S. Patent law, e.g., they allow for elements not explicitly recited, but exclude elements that are found in the prior art or that affect a basic or novel characteristic of the embodiment.

The term "injection quill" as used herein are used to introduce medium to highly corrosive chemicals into a pipeline without damage to the side port or pipe wall at the point of injection. The body and stinger are both constructed of chemical resistant plastics or alloys (PVC, Kynar, 316 SS, or Hastelloy C-276).

The term "ball valve" as used herein refers to a form of quarter-turn valve which uses a hollow, perforated, and pivoting ball to control flow through it. It is open when the ball's hole is in line with the flow and closed when it is pivoted 90-degrees by the valve handle. The handle lies flat in alignment with the flow when open, and is perpendicular to it when closed, making for easy visual confirmation of the valve's status. The shut position of ¼ turn could be in either clockwise (CW) or counterclockwise (CCW) direction. As used herein, the ball valve is preferably a ½-inch ball valve, but may also be larger or smaller in diameter.

The term "check valve," also known herein as the PVC injection quill, as used herein refers to valves that are standard two-port valves, meaning they have two openings in the body, one for fluid to enter and the other for fluid to leave. There are various types of check valves used in a wide variety of applications. Check valves are often part of common household items. Although they are available in a wide range of sizes and costs, check valves generally are very small, simple, and inexpensive. Check valves work automatically and most are not controlled by a person or any external control; accordingly, most do not have any valve handle or stem. The bodies (external shells) of most check valves are made of plastic or metal.

As used herein the term "calcification" refers to the process of change into a stony or calcareous substance by the deposition of lime salt.

As used herein the term "deposition" refers to the production of a thin film of material onto an existing surface.

The term "lime" as used herein refers to any inorganic material containing calcium, usually calcium oxide (quicklime) or calcium hydroxide (slaked lime).

The term "chemical water stopper" as used herein refers to a fitted piece of rubber, PVC, or other flexible material that forms a seal to prevent the backflow of chemicals or water from a chemical or water supply vessel during the cleaning of the chemical injection point of said chemical or water supply vessel.

As used herein, the term "paddle" refers to the tip of the decalcification tool 100, 502 in FIG. 1A, that accomplishes the decalcification, or removal of other debris, upon being rotated through an injection port. The rotation causes the paddle surfaces to apply impact forces on the debris to crack or breakup the debris for its removal through the injection port. The paddle 502 is preferably a triangular flathead tip with the wide segment being at the point of insertion into the injection point. The paddle may alternatively also be rectangular or square in shape, for example.

As used herein, the term "optional" or "optionally" means that a subsequently described even or circumstance may, but need not, occur, and that the description includes instances where the event or circumstance occurs an instances in which it does not.

The term "cleaning" as used herein includes removing a portion of debris or calcification within an annulus of the injection port for fluid to flow within the port. The cleaning performed by the tool as described herein my include unclogging an injection port.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein relate to a decalcification tool 100 configured to remove debris and/or calcification from chemical injection ports. The debris is one or more of calcification, residue from ammonia and residue from hydrogen peroxide.

The decalcification tool 100 includes a rod with a handle upstream a stopper (i.e., chemical water stopper) and a paddle downstream the stopper. The tip is configured to clean and/or breakup the debris or calcification, as it is manually rotated within the injection port.

Figure 1B:
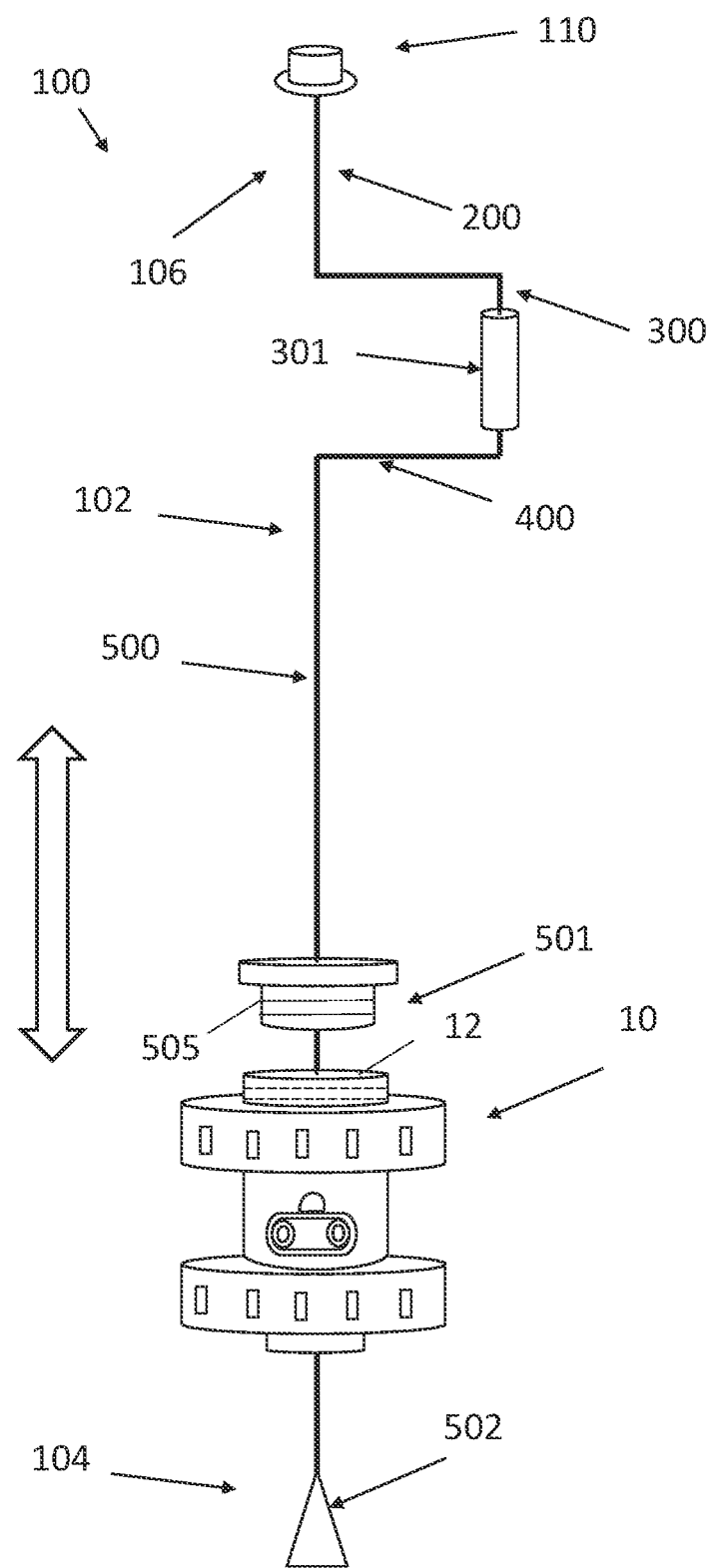
FIG. 1B illustrates the decalcification tool of FIG. 1A being installed in an injection port in accordance with some embodiments.
Figure 1C:
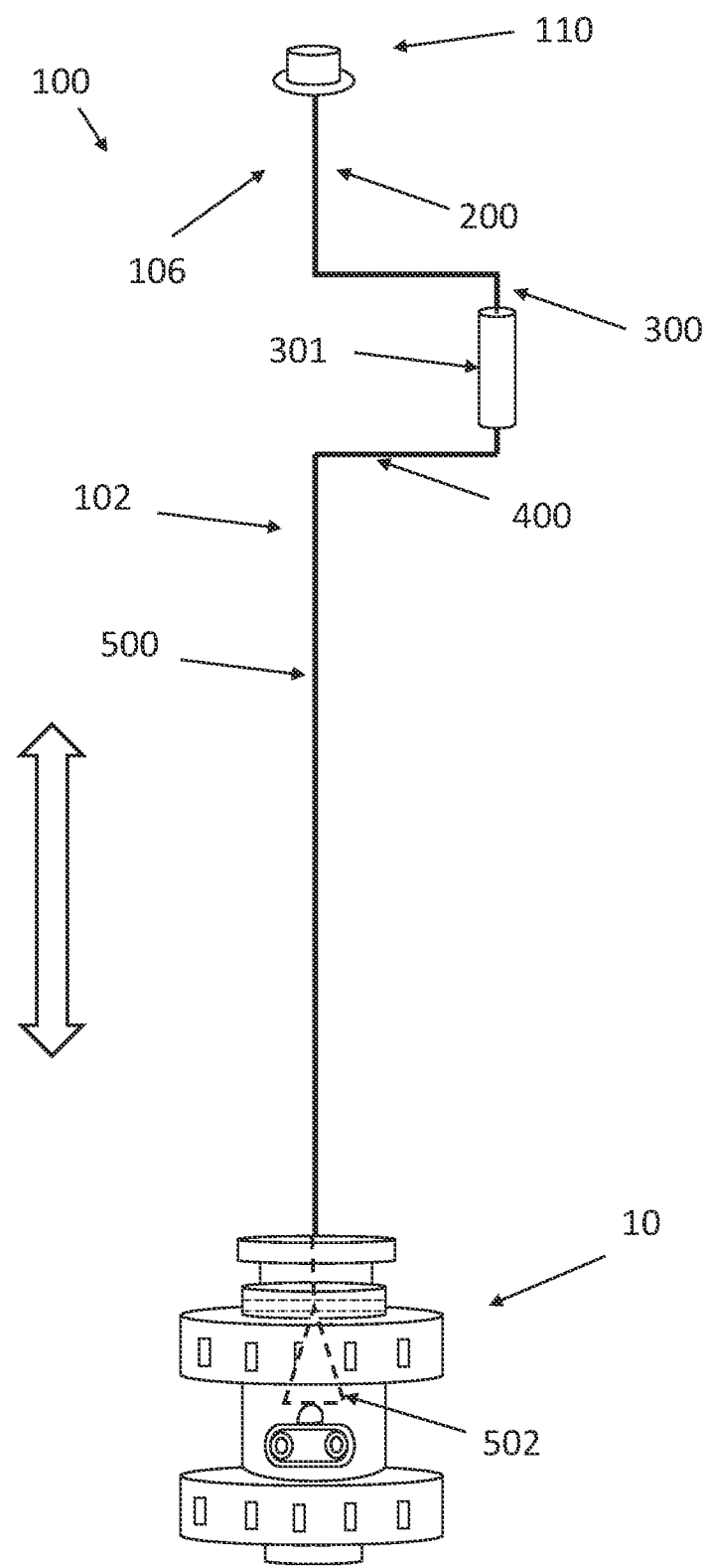
FIG. 1C illustrates the decalcification tool of FIG. 1A installed in the injection port and with the paddle in a first position within the injection port in accordance with some embodiments.
Figure 1D:
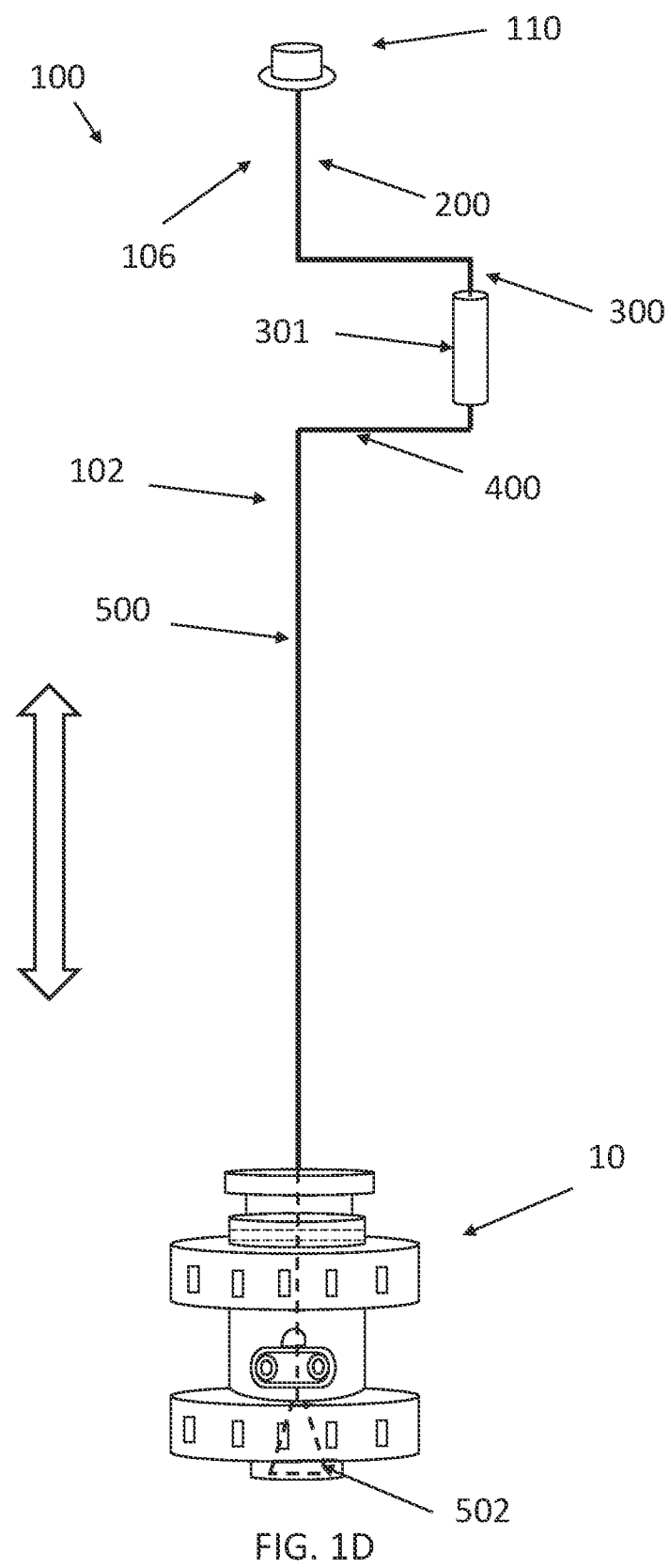
FIG. 1D illustrates the decalcification tool of FIG. 1A installed in the injection port and with the paddle in a second position within the injection port in accordance with some embodiments.

An embodiment of the decalcification tool 100 and its operation will be described in relation to FIGS. 1A-1D. FIG. 1A illustrates a decalcification tool 100 in accordance with some embodiments. FIG. 1B illustrates the decalcification tool 100 of FIG. 1A being installed in an injection port 10 in accordance with some embodiments. FIG. 1C illustrates the decalcification tool 100 of FIG. 1A installed in the injection port 10 and with the paddle 502 in a first position within the injection port 10 in accordance with some embodiments. FIG. 1D illustrates the decalcification tool 100 of FIG. 1A installed in the injection port 10 and with the paddle 502 in a second position within the injection port 10 in accordance with some embodiments.

The injection port 10 may be a chlorine injection port, for example. The injection port may become occluded either partially or fully by calcification or debris from use. The chemical injection port is between approximately 12" and approximately 18" in length. The chemical injection port is between approximately 18" and approximately 24" in length. The distal end of the chemical injection port may empty into a water supply treatment vessel where the broken particles of debris or calcification flow for removal out from the currently cleaned injection port.

Referring now to FIG. 1A, the decalcification tool 100 for cleaning chemical feed injection ports includes a handle 301 for manually rotating the paddle 502 during cleaning. The decalcification tool 100 includes an elongated rod 102 having a first end 104 and a second end 106. The rod 102 may be made of a metal material such as one of stainless steel, iron, bronze, and copper. The rod 102 may be a single piece or include rod segments connected, integrated, or coupled together to form a rod length.

The first end 104 of the rod 102 includes the paddle 502, the paddle being configured to remove debris deposited along interior surfaces of an injection port 10 (FIGS. 1B-1D), and injection quill or the like. The paddle 502 is sometimes also referred to as a "tip 502." The tip 502 has a geometric shape that may be one of triangular, rectangular, square, oval, and circular. The tip 502 for debris removal may have a Phillips head shape.

The tip 502 may be a flathead tip with a geometric shape selected from one of rectangular, square, oval, and circular. The flathead tip may be stamped from the metal material of the rod at the first end 104. The tip dimensions should not exceed those of the annulus of the injection port having the debris. The width of the tip may be smaller than the diameter of the annulus of the injection port so that the tip does not damage the inner diameter surface of the injection port.

Handle

The handle 301 may include a handle sheath. The handle 301 or handle sheath may be made of PVC, rubber, plastic, and wood. The handle 301 is configured to be offset.

Stopper

Figure 2:
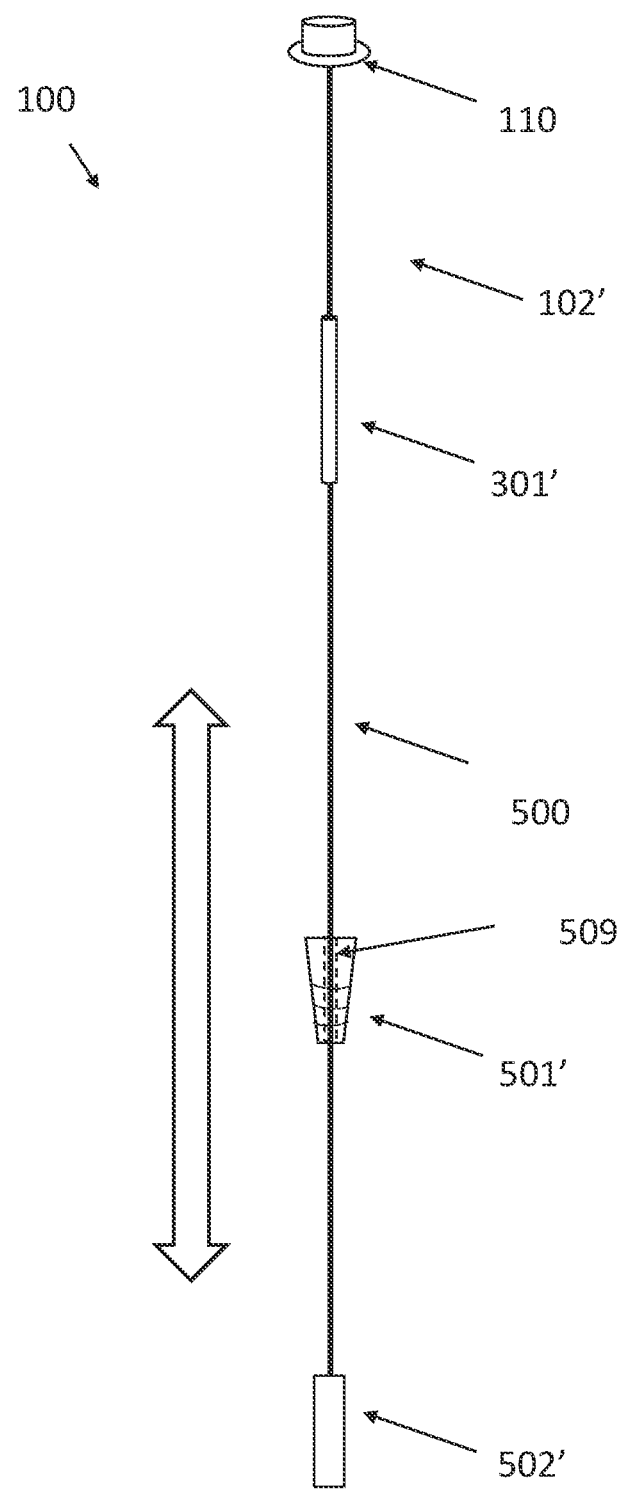
FIG. 2 illustrates a decalcification tool with an inline handle in accordance with some embodiments.

The decalcification tool 100 may include a stopper 501 at a location between the handle 301 and the tip 502. The stopper 501 may be made of one of PVC, rubber, and plastic. The stopper 501 may be approximately ½". The stopper 501 may include threads 505 on the exterior surface to be installed in an orifice 12 of the injection port 10 (FIG. 1B). The stopper 501 may be configured to slide along a portion of the rod 102. The stopper may include a flange 507 to use to screw or unscrew the stopper. In some embodiments, the stopper 501 may slide along the rod 102 so that the paddle 502 moves along a length of the injection port 10, as seen in FIGS. 1C and 1D. The stopper 501 is configured to prevent or limit fluids from exiting the orifice 12 of the injection port 10 the stopper 501 is installed within. As shown in FIG. 2, for example, the stopper 501 may include a channel 509 for sliding the rod 102 up and down within the stopper 501.

Cap

The decalcification tool 100 may include, at the second end 106, a cap 110. The cap 110 may include a flange 112 and/or a hat 114.

Rod

The rod 102 may include a single rod. The rod 102 may include at least two of a first rod segment 200, a second rod segment 300, a third rod segment 350, a fourth rod segment 400 and a fifth rod segment 500. The rod 102 may be bent to form at least two of a first rod segment 200, a second rod segment 300, a third rod segment 350, a fourth rod segment 400 and a fifth rod segment 500. For the sake of discussion, the third rod segment 350 may be a handle bar segment which may alone serve as a handle, for example.

In the embodiment of FIG. 1A, the rod 102 includes a first rod segment 200 between the handle 301 and the cap 110. The rod 102 may also include the fifth rod segment 500 between the handle 301 and the paddle 502. In the embodiment of FIG. 1A, the rod 102 has an offset handle 301. Therefore, the rod 102 includes a second rod segment 300, a third rod segment 350, and a fourth rod segment 400 which form a generally U-shape offset to position an elongated axis of the handle 301 parallel to, but offset from, the elongated axis of the rod 102. The handle 301 is installed on the third rod segment 350. The first end of the second rod segment integrates with or connects to an end of the first rod segment 200 opposite the end to which the cap 110 is attached. The third rod segment 350 is integrated with or coupled to a second end of the second rod segment. The third rod segment 350 is integrated with or coupled to a first end of the fourth rod segment 400, where the fourth rod segment 400 is integrated with or coupled to a first end of the fifth rod segment 500. The first end of the fifth rod segment 500 being opposite the end to which the tip 502 is integrated or coupled.

In some embodiments, the U-shaped offset may be substituted with an L-shaped offset which places the elongated axis of the handle 301 perpendicular to the elongated axis of the rod 102. In some embodiments, the first rod segment may include a second handle so that a second hand of the user may hold the tool or rod. Still further, the cap may be used to hold and/or rotate the rod or tool.

The first rod segment may be approximately 3" (inches). The second rod segment and fourth rod segments may be approximately 3". The third rod segment 350 may be approximately 5". The handle may be approximately 4.5". The fifth rod segment 500 may be approximately 12"-24." The tool may have at least a length of at least 12" and up to 24".

Referring now to FIGS. 1B-1D, the injection port 10 will now be described. The injection port 10 includes an orifice 12 into the injection port. The inner surface of the orifice 12 is threaded, denoted as dashed lines. The threads of the orifice 12 mate with the threads 505 of the stopper 501. The stopper 501 may be screwed into the orifice 12.

In operation, the paddle 502 and rod 102 are inserted through the orifice 12 of the injection port 10, for example, as shown in FIG. 1B. Then, the stopper 501 is threaded in the orifice 12, as best seen in FIG. 1C. The user may rotate the paddle 502 within the injection port 10. The user may also slide the paddle 502 along the longitudinal axis of the injection port. The longitudinal axis of the injection port 10 is aligned with the center axis of the orifice 12.

The embodiment further provides the above decalcification tool as shown in FIG. 1A, wherein the first metal rod or rod segment is proximally capped with an optionally circular flange.

The decalcification tool 100 as shown in FIG. 1A, may include a rod or fifth rod segment that is between approximately 12" and 18" in length.

In operation, to rotate the rod 102, the user may grasp their hand around handle 301 while also grasping at least one of the first rod segment 200 and cap 110.

FIG. 2 illustrates a decalcification tool 100 with an inline handle 301' in accordance with some embodiments. The rod 102' is similar to the rod of FIG. 1A, thus only the differences will be described. In FIG. 2, the U-shaped offset is eliminated. Thus, the second, third and fourth rod segments are eliminated in this view. The paddle 502' may be the same as shown in FIG. 1A. However, for illustrative purposes, the paddle 502' has a rectangular shape. In this embodiment, the paddle 502' may also be formed from the rod material by stamping or making flat the rod. The paddle 502' may be one of square, triangular, oval, circular or other geometric shape. In FIG. 2, for the sake of discussion, that portion on which the handle 301' is affixed, may also be a handle bar segment. The first rod segment is above the handle bar segment of the rod 102'. The fifth rod segment is below the handle bar segment.

In some embodiments, the paddle 502 may be affixed to end 104 of the rod 102 or 102'. The decalcification tool 100 of FIG. 2 includes a stopper 501'. The stopper 501' may include a truncated conical shaped with exterior threads. The stopper 501' includes a channel 509, denoted in dashed lines, for sliding rod 102' therein along a longitudinal axis of the stopper.

Figure 3:
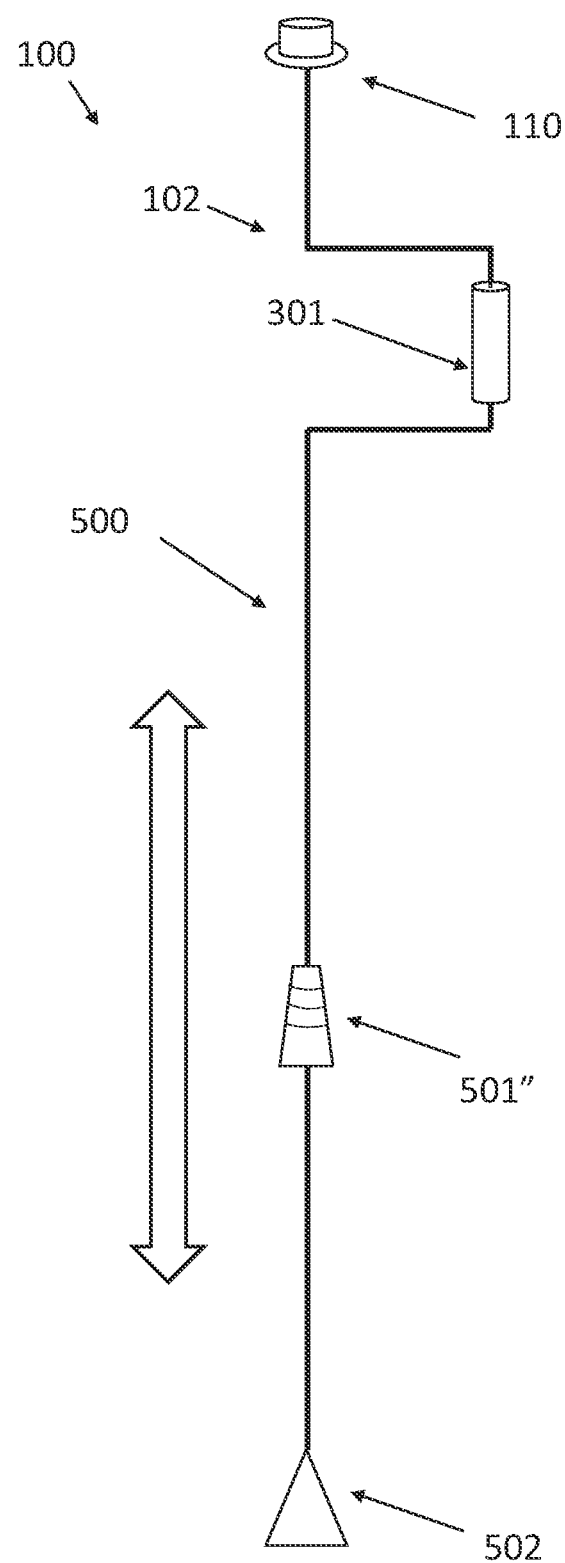
FIG. 3 illustrates a decalcification tool with an offset handle in accordance with some embodiments.

FIG. 3 illustrates a decalcification tool 100 which includes an offset handle as described in relation to FIG. 1A in accordance with some embodiments. Since FIG. 3 is similar to FIG. 1A, only the differences will be described. The stopper 501" may include a truncated conical shaped with exterior threads. The stopper is designed to allow the rod to slide along a longitudinal axis of the stopper.

Figure 4:
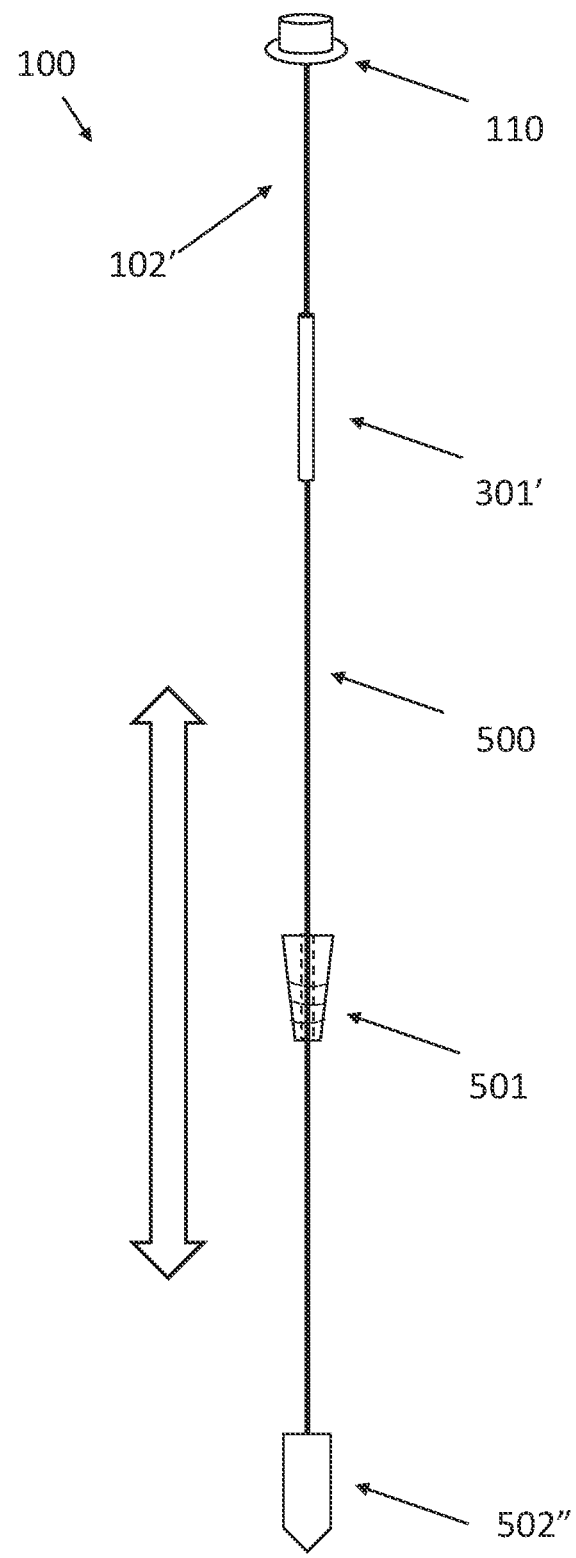
FIG. 4 illustrates a decalcification tool with an inline handle in accordance with some embodiments.

FIG. 4 illustrates a decalcification tool 100 with an inline handle as described in FIG. 2 in accordance with some embodiments. Since FIG. 4 is similar to FIG. 2, only the differences will be described. In this view, the paddle 502" has a Philips head shape.

The decalcification tool 100 of FIG. 1A is easily constructed by bending an iron or metal rod using a vice to create the 90-degree angled portion that functions as the handle which is used by hand to rotate the tool through the injection port 10 to clean solid chemical debris from within the injection port 10.

Before bending the rod, a handle may be slid onto the rod. In some embodiments, the rod may be bent to form the 90-degree turn to create the second rod segment 300. Then after forming the second rod segment 300, the handle may be slid onto rod. Then, the rod may be bent again to form the third and fourth rod segments, for example. However, the handle may be slid onto the rod after forming the third rod segment, but before bending the rod to form the fourth and fifth rod segments.

After forming the fifth rod segment, the stopper may be slid onto the rod from the end 104. After the stopper is installed, the paddle may be made or installed on end 104. The cap may be installed on end 106 at any time during the formation of the tool.

In some embodiments, a second handle may be installed onto the rod between the cap and the bend forming the second rod segment.

In other embodiments, the rod is not bent as shown in FIG. 2. The handle may be prevented from sliding along the rod 102. The handle may be glued, welded, or fastened to the rod so that the handle is fixed in location on rod 102.

In some embodiments, the third rod segment may serve as a handle without the need for a handle with a handle sheath.

In relation to FIGS. 2-4, in some embodiments, the tool 100 may be formed by first forming or affixing the paddle and then the handle. After the handle is installed, the cap may be attached. Still further, after installing the handle, the fourth segment, third and second rod segments may be formed.

Figure 5:
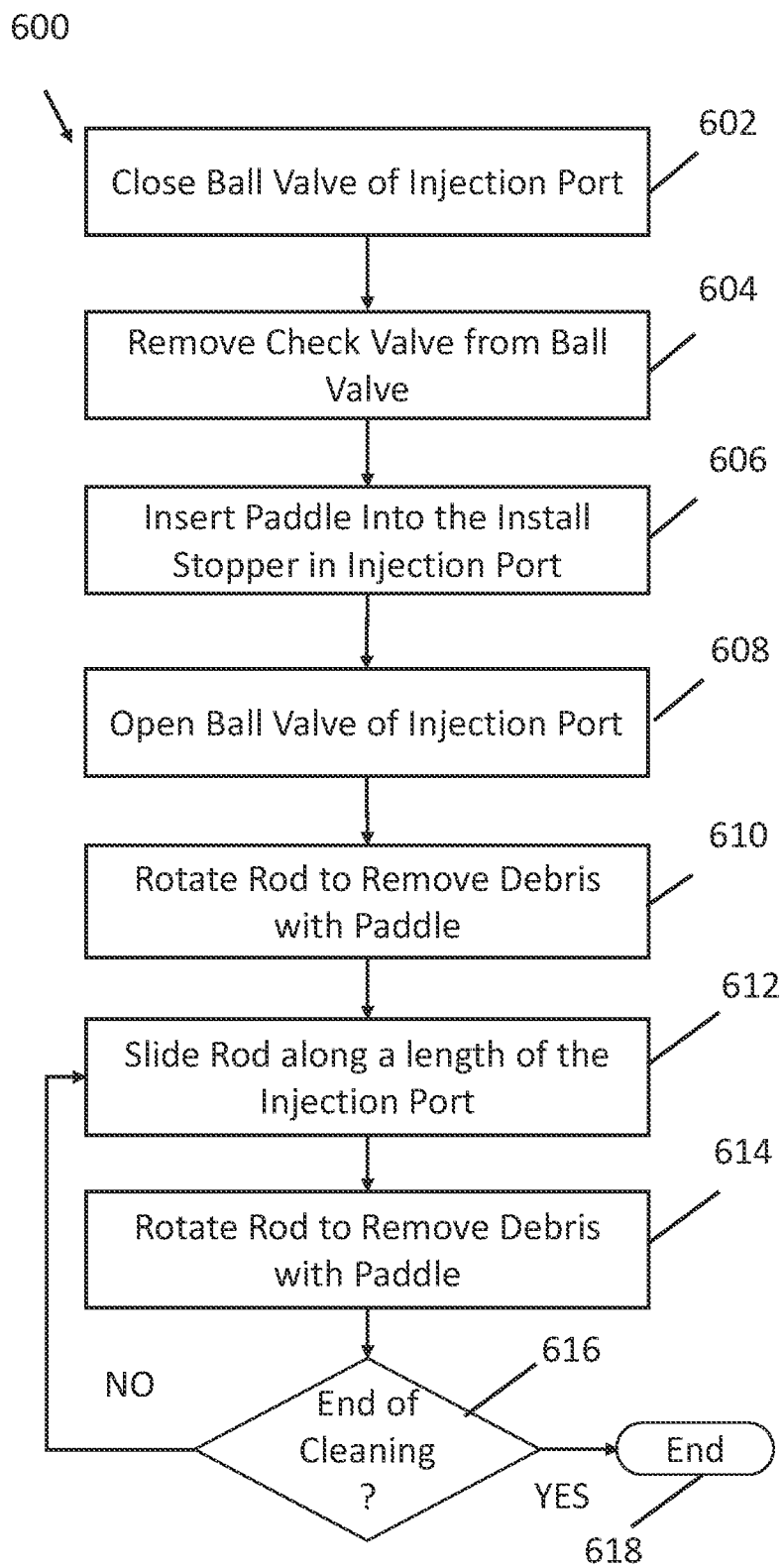
FIG. 5 illustrates a flowchart of a method of cleaning a chemical injection port in accordance with some embodiments.

FIG. 5 illustrates a flowchart of a method 600 for cleaning an injection port. The method may be performed in the order shown or a different order. In some embodiments, one or more of the blocks may be omitted or added. One or more of the blocks may be performed contemporaneously. The method 600 will be described in relation to the tool 100 of FIG. 1A. However, the method applies to the tools of FIGS. 2-4 as well.

At block 602, the method 600 may include closing a ball valve (approximately ½ inch) at the injection point for a chemical feed injection port. At block 604, the method 600 may include removing a check valve, also known as the PVC injection quill, from the ball valve. At block 606, the method 600 may include inserting the paddle and stopper of the decalcification tool 100 into the ball valve and tightening the stopper into the ball valve to prevent leakage. At block 608, the method 600 may include opening the ball valve and, at block 610, turning the rod by hand to break up the calcification at the injection site without damaging the PVC parts. As the rod 102 is turned so is the paddle 502. The paddle 502 applies a force of pressure to crack the debris or calcification from the sides of the injection port.

At block 612, the method 600 may include sliding the paddle 502 of the decalcification tool 100 along the injection port. Simultaneously, while sliding, the method 600 may include, at block 614, rotating the paddle 502 using the handle 301. As the paddle is rotated, the paddle applies impact forces on the debris which may form chips of debris or particles of broken debris. At block 616, the user may determine whether the cleaning is complete. If the determination, at block 616, is "NO," the method 600 may loop back to block 612. If the determination, at block 616, is "YES," the method 600 may end at block 618.

After the cleaning is done, the rod 102 may then be removed and the ball valve closed. The stopper 501 is then removed and check valve replaced.

The method 600 may include autonomously flowing chips of debris into the water supply treatment vessel.

The above method may also be used to remove debris from the injection quill itself, wherein the tip or paddle of the tool 100 is smaller and will not damage the quill.

Either of the above methods may be used, but are not limited, to clearing from a chemical injection port: i) calcification; ii) residue from ammonia; or iii) residue from hydrogen peroxide.

The embodiment further provides a method of cleaning out one of a chemical injection port and chemical injection quill using any one of the above decalcification tool 100 generally as shown in FIG. 1A.

The embodiment further provides a method of cleaning out a chemical injection port or chemical injection quill using any one of the above decalcification tools 100 generally as shown in FIGS. 1A and 2-4, wherein the chemical injection port is a chlorine injection port.

The embodiment further provides a method of cleaning out a chemical injection port or chemical injection quill using any one of the above decalcification tools 100 generally as shown in FIGS. 1A and 2-4, wherein the injection port is occluded either partially or fully by calcification.

The embodiment further provides a method of cleaning out a chemical injection port or chemical injection quill using any one of the above decalcification tools 100 generally as shown in FIGS. 1A and 2-4, wherein the chemical injection port is less than 18" in length.

The embodiment further provides a method of cleaning out a chemical injection port or chemical injection quill using any one of the above decalcification tools 100 generally as shown in FIGS. 1A and 2-4, wherein the distal end of the chemical injection port empties into a water supply treatment vessel.

The embodiment further provides a method of cleaning out a chlorine injection port or chemical injection quill using any one of the above decalcification tools 100 generally as shown in FIGS. 1A and 2-4, wherein the distal end of the chlorine injection port empties into a water supply treatment vessel.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A decalcification tool for cleaning a chemical feed injection port, the tool comprising:
   a rod having a first end, a second end and a handle bar segment between the first end and the second end;
   a stopper having a threaded exterior surface for mating with an orifice of an injection port and installed on the rod at a location below the handle bar segment and above the first end, the stopper being slidable along a portion of a longitudinal axis of the rod; and
   a paddle integrated with or affixed with the first end of the rod and configured to be inserted into the injection port, wherein rotation of the rod causes the paddle to rotate within the injection port such that the paddle applies impact forces to chip, crack, or breakup debris along an interior surface of the injection port.

2. The decalcification tool of claim 1, wherein the debris is calcification, residue from ammonia or residue from hydrogen peroxide.

3. The decalcification tool of claim 1, wherein the stopper is made of polyvinyl chloride (PVC).

4. The decalcification tool of claim 1, wherein the rod is made of iron, copper, stainless steel, or bronze.

5. The decalcification tool of claim 1, further comprising a cap with a flange coupled to the second end of the rod.

6. The decalcification tool of claim 1, wherein the rod comprises a U-shaped offset, wherein the U-shaped offset includes the handle bar segment.

7. The decalcification tool of claim 6, further comprising a handle coupled to the handle bar segment.

8. The decalcification tool of claim 6, wherein:
   the rod further comprises a first rod segment, a second rod segment, a third rod segment, a fourth rod segment and a fifth rod segment;
   the U-shaped offset comprises the second rod segment, the third rod segment, and the fourth rod segment;
   the first rod segment is above the U-shaped offset;
   the fifth rod segment is below the U-shaped offset; and
   a length of the fifth rod segment is between 12" and 24".

9. The decalcification tool of claim 1, wherein the rod is made from a metal and the paddle is a flattened portion of the rod.

10. The decalcification tool of claim 9, wherein the paddle has a flathead tip that has a shape that is one of triangular, rectangular, square, oval, circular and Phillips head type.

11. The decalcification tool of claim 10, wherein the paddle has a width which is less than a diameter of an inner surface of an annulus of the injection port.

12. A method of cleaning a chemical injection port using the decalcification tool of claim 1 to apply impact forces to chip, crack or breakup debris along an interior surface of the injection port.

13. The method of claim 12, wherein a distal end of the chemical injection port empties into a water supply treatment vessel; and further comprising:
   impacting the debris with the paddle of the tool;
   forming chips of debris by the paddle of the tool; and
   autonomously flowing the chips of the debris into the water supply treatment vessel.

14. The method of claim 13, wherein the chips of the debris is calcification, residue from ammonia or residue from hydrogen peroxide.

15. The method of claim 12, further comprising:
   threading the stopper of the tool onto an orifice of the injection port;
   sliding the rod within the stopper;
   moving the paddle of the tool, in response to the slide of the rod, within the injection port; and
   rotating the rod to apply impact forces by the paddle on the debris within the injection port.

16. The method of claim 15, wherein the rotating of the rod includes rotating the rod at the handle bar segment of the rod with a first hand.

17. The method of claim 15, further comprising:
   holding the rod at a location above the handle bar segment of the rod with a second hand.

18. The method of claim 15, wherein the rod has a length of at least 12" and up to 24".

19. The method of claim 15, wherein the rod and paddle are made of metal.

20. The method of claim 12, further comprising closing a valve of the injection port prior to using the tool.

* * * * *